(12) United States Patent
Hyakudai et al.

(10) Patent No.: US 12,335,055 B2
(45) Date of Patent: Jun. 17, 2025

(54) COMMUNICATION DEVICE AND COMMUNICATIONS SYSTEM WITH STATE-SWITCHING CONTROL TO SYNCHRONIZE AND CONTROL SWITCHING AMONG COMMUNICATION STATES

(71) Applicant: Sony Semiconductor Solutions Corporation, Kanagawa (JP)

(72) Inventors: Toshihisa Hyakudai, San Diego, CA (US); Junya Yamada, Kanagawa (JP); Satoshi Ota, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 401 days.

(21) Appl. No.: 17/879,243

(22) Filed: Aug. 2, 2022

(65) Prior Publication Data

US 2023/0066221 A1   Mar. 2, 2023

Related U.S. Application Data

(60) Provisional application No. 63/237,675, filed on Aug. 27, 2021.

(51) Int. Cl.
*H04L 12/12* (2006.01)
*H04L 5/14* (2006.01)
*H04L 67/12* (2022.01)

(52) U.S. Cl.
CPC ........... *H04L 12/12* (2013.01); *H04L 5/14* (2013.01); *H04L 67/12* (2013.01)

(58) Field of Classification Search
None
See application file for complete search history.

(56) References Cited

U.S. PATENT DOCUMENTS

| 2003/0165142 A1 | 9/2003 | Mills |
| 2010/0046543 A1 | 2/2010 | Parnaby |

(Continued)

FOREIGN PATENT DOCUMENTS

| JP | H09027801 A | 1/1997 |
| JP | 2010148088 A | 7/2010 |

(Continued)

*Primary Examiner* — Saad Khawar
(74) *Attorney, Agent, or Firm* — Michael Best & Friedrich LLP

(57) ABSTRACT

Communication with state-switching control is disclosed. In one example, a communication device includes a state-switching control circuit that controls switching between a first state in which synchronization for communicating with a partner device is established, a second state in which the communication is started after establishing the synchronization, a third state in which the communication is intermittently stopped, and a fourth state in which synchronization is reestablished when restarting the communication. A first communication control circuit repeats an operation of continuously transmitting a first signal to the partner device in the fourth state, and a second communication control circuit transmits, upon receiving a second signal, a third signal synchronized with the second signal to the partner device, in which the state-switching control circuit switches, where the second communication control circuit transmits the third signal, a state from the fourth state to the first state.

19 Claims, 15 Drawing Sheets

ASA state diagram

(56) References Cited

U.S. PATENT DOCUMENTS

| | | | |
|---|---|---|---|
| 2013/0268783 A1 | 10/2013 | Diab | |
| 2014/0044027 A1* | 2/2014 | Beale | H04W 56/00 370/311 |
| 2015/0109981 A1* | 4/2015 | Patil | H04W 52/0212 370/336 |

FOREIGN PATENT DOCUMENTS

| | | |
|---|---|---|
| JP | 2011239011 A | 11/2011 |
| JP | 2014505460 A | 2/2014 |
| JP | 2018081688 A | 5/2018 |

* cited by examiner

1: ASA system

ASA TDD signals

ASA state diagram

Start up sequence

COMMUNICATION DEVICE AND COMMUNICATIONS SYSTEM WITH STATE-SWITCHING CONTROL TO SYNCHRONIZE AND CONTROL SWITCHING AMONG COMMUNICATION STATES

CROSS REFERENCE TO RELATED APPLICATIONS

This application claims the benefit of U.S. Priority Patent Application No. 63/237,675 filed Aug. 27, 2021, the entire contents of which are incorporated herein by reference.

BACKGROUND

The present disclosure relates to a communication device and communications system.

A technology for performing high-speed serial communication between a plurality of apparatuses has been proposed (Patent Literature 1). This type of high-speed serial communication is used in various fields and used for communication between in-vehicle devices, for example.

SUMMARY

With the development of an automated driving technology and an electronic technology, the need for high-speed communication between in-vehicle devices is increasing. The Automotive SerDes Alliance (ASA) assumes that time division duplexing (TDD) communication is performed between a Root device and a Leaf device connected to a cable.

Since the Root device and the Leaf device do not always communicate with each other, in the case where communication is not performed for a predetermined time or longer, the states of the Root device and the Leaf device are caused to transition to reduce the power consumption.

The ASA standard version 1.01 defines a light sleep state and a deep sleep state. The light sleep state is a state in which the communication is temporarily stopped at time intervals longer than the TDD switching time and shorter than the time during when the synchronization between devices can be maintained. In the light sleep state, since the synchronization between devices is maintained even during the communication stop period, the communication can be resumed quickly. Meanwhile, the deep sleep state is a state in which communication is stopped for a long period of time, and it is necessary to reestablish the synchronization between devices when resuming the communication.

The Root device includes an ECU inside, and therefore is capable of transitioning from the deep sleep state to a normal state by itself. Meanwhile, the Leaf device includes no ECU inside, and therefore it is necessary to provide a mechanism to cause the Leaf device to transition from the deep sleep state to the normal state. The ASA standard version 1.01 does not specify a processing procedure for causing the Leaf device to transition from the deep sleep state to the normal state, and there is a possibility that the Leaf device is not able to quickly transition from the deep sleep state to the normal state.

In this regard, it is desired to provide a communication device and a communications system that are capable of performing serial communication with low power consumption and at high speed.

In accordance with an embodiment of the present disclosure, there is provided a communication device, including:

a state-switching control unit that controls switching between a first state in which synchronization for communicating with a communication partner device is established, a second state in which the communication is started after establishing the synchronization in the first state, a third state in which the communication is intermittently stopped without losing the establishment of the synchronization, and a fourth state in which the communication is stopped for a longer time than the third state and synchronization is reestablished with the communication partner device when restarting the communication;

a first communication control unit that repeats, in a first cycle, an operation of continuously transmitting a first signal within a first signal interval to the communication partner device in the fourth state; and a second communication control unit that transmits, upon receiving a second signal output from the communication partner device in response to the first signal, a third signal synchronized with the second signal to the communication partner device, in which the state-switching control unit switches, where the second communication control unit transmits the third signal, a state from the fourth state to the first state.

In accordance with an embodiment of the present disclosure, there is provided a communication device, including:

a first state-switching control unit that controls switching between a first state in which synchronization for communicating with a first communication partner device is established, a second state in which the communication is started after establishing the synchronization in the first state, a third state in which the communication is intermittently stopped without losing the establishment of the synchronization, and a fourth state in which the communication is stopped for a longer time than the third state and synchronization is reestablished with the first communication partner device when restarting the communication;

a second state-switching control unit that controls switching between the first state, the second state, the third state, and the fourth state in communication with a second communication partner device;

a first communication control unit that transmits, upon repeatedly receiving, in a first cycle, a first signal continuously transmitted from the second communication partner device within a first signal interval while the second communication partner device is in the fourth state, the received first signal to the first communication partner device; and a second communication control unit that transmits, upon receiving a second signal output from the first communication partner device in response to the first signal, the second signal to the second communication partner device, in which the first state-switching control unit transitions from the fourth state to the first state upon transmitting the second signal from the first communication partner device.

The second state-switching control unit may cause, where the first signal from the second communication partner device has been received in the fourth state, the first communication partner device in the first state, the second state, or the third state to transition to the first state.

The first communication control unit may repeat, in the first cycle, an operation of continuously transmitting the first signal within the first signal interval, the first signal being generated using a pseudo-random number.

The first communication control unit may generate the first signal on the basis of a polynomial of $X^{23}+X^5+1$.

In accordance with an embodiment of the present disclosure, there is provided a communication device, including:
a state-switching control unit that controls switching between a first state in which synchronization for communicating with a communication partner device is established, a second state in which the communication is performed after establishing the synchronization in the first state, a third state in which the communication is intermittently stopped without losing the establishment of the synchronization, and a fourth state in which the communication is stopped for a longer time than the third state and synchronization is reestablished with the communication partner device when restarting the communication;
a first communication control unit that repeatedly receives, in a first cycle, a first signal continuously transmitted from the communication partner device within a first signal interval while the communication partner device is in the fourth state; and
a second communication control unit that transmits, to the communication partner device, a second signal synchronized with the first signal received by the first communication control unit.

The first signal may have a signal amplitude that is equal to or less than a signal amplitude of the second signal.

The signal amplitude of the first signal may be 0.2 times or more and 0.8 times or less the signal amplitude of the second signal.

The signal amplitude of the first signal may be 0.4 times or more and 0.6 times or less the signal amplitude of the second signal.

The signal amplitude of the first signal may be 0.5 times the signal amplitude of the second signal.

The first signal interval may be equal to or less than a second signal interval in which the second signal is continuously output.

The first signal interval may be 0.5 times the second signal interval.

The first signal interval may be 768 [nsec], and the first cycle may be 4816 [nsec].

The first signal interval may be 1536 [nsec], and the first cycle maybe 3280 [nsec].

The first signal and the second signal may have the same signal amplitude and the same cycle, and the first signal interval may have the same length as that of a second signal interval in which the second signal is continuously output.

Each of the first signal interval and the second signal interval may be 1536 [nsec], and each of the first signal and the second signal may have a cycle of 3280 [nsec].

Information may be alternately transmitted/received to/from the communication partner device within a period assigned by a time division duplex (TDD) communication method.

In accordance with an embodiment of the present disclosure, there is provided a communications system, including:
a first communication device; and
a second communication device that alternately transmits/receives information to/from the first communication device within a period assigned by a time division duplex (TDD) communication method, in which
the second communication device includes
a state-switching control unit that controls switching between a first state in which synchronization for communicating with the first communication device is established, a second state in which the communication is performed after establishing the synchronization in the first state, a third state in which the communication is intermittently stopped without losing the establishment of the synchronization, and a fourth state in which the communication is stopped for a longer time than the third state and synchronization is reestablished with the first communication device when restarting the communication,
a first communication control unit that repeats, in a first cycle, an operation of continuously transmitting a first signal within a first signal interval to the first communication device in the fourth state, and
a second communication control unit that transmits, upon receiving a second signal output from the first communication device in response to the first signal, a third signal synchronized with the second signal, and transitions from the fourth state to the first state.

The communications system may further include a third communication device that alternately transmits/receives information to/from the first communication device within the period assigned by the TDD communication method and alternately transmits/receives information to/from the second communication device within the period assigned by the TDD communication method, in which
the third communication device may include
a first communication control unit that transmits, upon repeatedly receiving, in a first cycle, a first signal continuously transmitted from the second communication device within a first signal interval while the second communication device is in the fourth state, the received first signal to the first communication device,
a second communication unit that transmits, upon receiving a second signal output from the first communication device in response to the first signal, the second signal to the second communication device, and
a second communication control unit that transmits, upon receiving a third signal synchronized with the second signal from the second communication device, the third signal to the first communication device and transitions from the fourth state to the first state.

The communications system may further include a plurality of the third communication devices connected to each other by daisy chain between the first communication device and the second communication device, in which
each of the plurality of third communication devices may sequentially transmit, to the third communication device on a side closer to the first communication device or to the first communication device, the first signal of the first cycle continuously transmitted from the second communication device within the first signal interval while the plurality of third communication devices and the second communication device are in the fourth state, sequentially receive a second signal synchronized with the first signal transmitted from the first communication device, transmit the received second signal to the third communication device on a side closer to the second communication device or to the second communication device, and transition from the fourth state to the first state.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, a communication device and a communications system 1 according to an embodiment will be described with reference to the drawings. Although main components of the communication device and the communications system 1 will be mainly described below, the communication device and the communications system 1 can have components and functions that are not shown or described. The following description does not exclude components and functions that are not shown or described.

The communications system 1 according to an embodiment of the present disclosure performs time division duplexing (TDD) communication between a plurality of communication devices. The communication device and the communications system 1 that conform to the ASA standard will be mainly described below.

Figure 1:
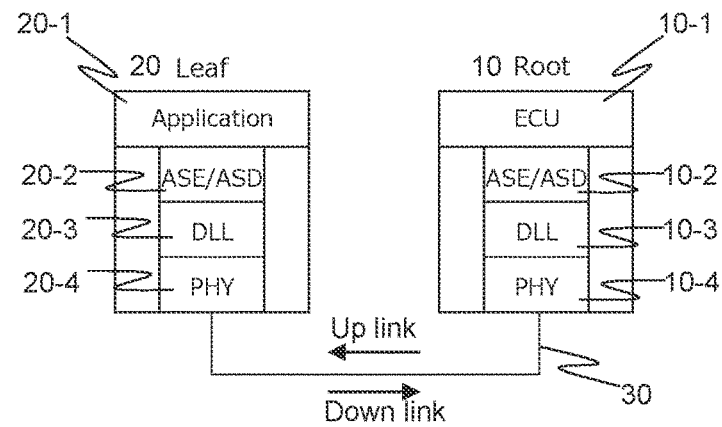
FIG. 1 is a block diagram showing a schematic configuration of a communications system according to an embodiment of the present disclosure.

FIG. 1 is a block diagram showing a schematic configuration of the communications system 1 according to an embodiment of the present disclosure. The communications system 1 in FIG. 1 includes a Root device (10) and a Leaf device (20) that conform to the ASA standard. The Root device (10) and the Leaf device (20) alternately performs TDD communication with each other. Herein, a path for transmitting information to be transmitted from the Root device (10) to the Leaf device (20) is referred to as an Up link, and a path for transmitting information to be transmitted from the Leaf device (20) to the Root device (10) is referred to as a Down link. The Up link and the Down link are provided in the same cable (30).

The Root device (10) includes an ECU (10-1), an ASE/ASD unit (10-2), a DLL unit (10-3), and a PHY unit (10-4). The ECU (10-1) controls the entire system and receives and processes an application signal such as a video signal transmitted from the Leaf device (20). The ECU (10-1) generates a control signal for controlling the respective units. The ASE/ASD unit (10-2) performs ASE processing for encapsulating the control signal from the ECU (10-1) and ASD processing for decoding the encapsulated application signal from the Leaf device (20) into the original application signal. The DLL unit (10-3) generates an Up link packet including the application signal encapsulated by the ASE/ASD unit (10-2), extracts the application signal included in a Down link packet transmitted from the Leaf device (20), and transmits the extracted application signal to the ASE/ASD unit (10-2). The PHY unit (10-4) outputs a signal including the Up link packet generated by the DLL unit (10-3) to the cable (30) in accordance with the TDD timing, receives a signal including the Down link packet transmitted from the Leaf device (20) to the cable (30), and transmits the received Down link packet to the DLL unit (10-3).

The Leaf device (20) includes an Application unit (20-1), an ASE/ASD unit (20-2), a DLL unit (20-3), and a PHY unit (20-4). The Leaf device (20) operates in accordance with the control signal transmitted from the Root device (10) via the Up link and transmits the Down link packet including the application signal generated by the Application unit (20-1) of the Leaf device (20) to the Root device (10) via the Down link.

The Application unit (20-1) generates an application signal such as a video signal and an audio signal. The ASE/ASD unit (20-2) performs ASE processing for encapsulating an application signal and ASD processing for decoding the encapsulated control signal from the Root device (10).

The DLL unit (20-3) generates a Down link packet including the application signal encapsulated by the ASE/ASD unit (20-2), extracts the encapsulated control signal from the Up link packet transmitted from the Root device (10), and transmits the extracted control signal to the ASE/ASD unit (20-2).

The PHY unit (20-4) outputs a signal including the Down link packet generated by the DLL unit (20-3) to the cable (30) in accordance with the TDD timing, receives a signal including the Up link packet transmitted from the Root device (10) to the cable (30), and transmits the received Up link packet to the DLL unit (20-3).

Figure 2:
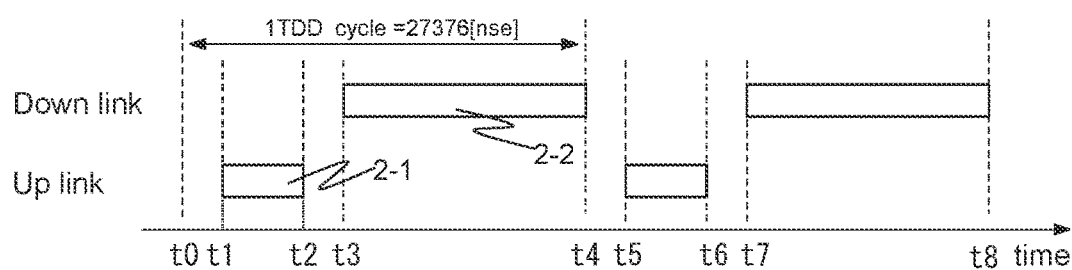
FIG. 2 is a diagram describing TDD communication conforming to the ASA standard.

FIG. 2 is a diagram describing TDD communication conforming to the ASA standard. As shown in FIG. 2, in the ASA standard, one cycle (time period from t0 to t4) of the TDD communication method is 27376 ns. The time period t0 to t1 and the time period from t2 to t3 are each the signal switching period between the Up link signal and the Down link signal. The time period from t1 to t2 is the transmission period of an Up link packet and the time period from t3 to t4 is the transmission period of a Down link packet.

The signal capacity of the application signal output from the Leaf device (20) is typically much larger than the signal capacity of the control signal output from the Root device (10). For this reason, as shown in FIG. 2, in the ASA standard using the TDD communication method, the period (time period from t3 to t4) assigned to the Down link for transmitting an application signal or the like is longer than the period (time period from t1 to t2) assigned to the Up link for transmitting a control signal or the like.

Figure 3:
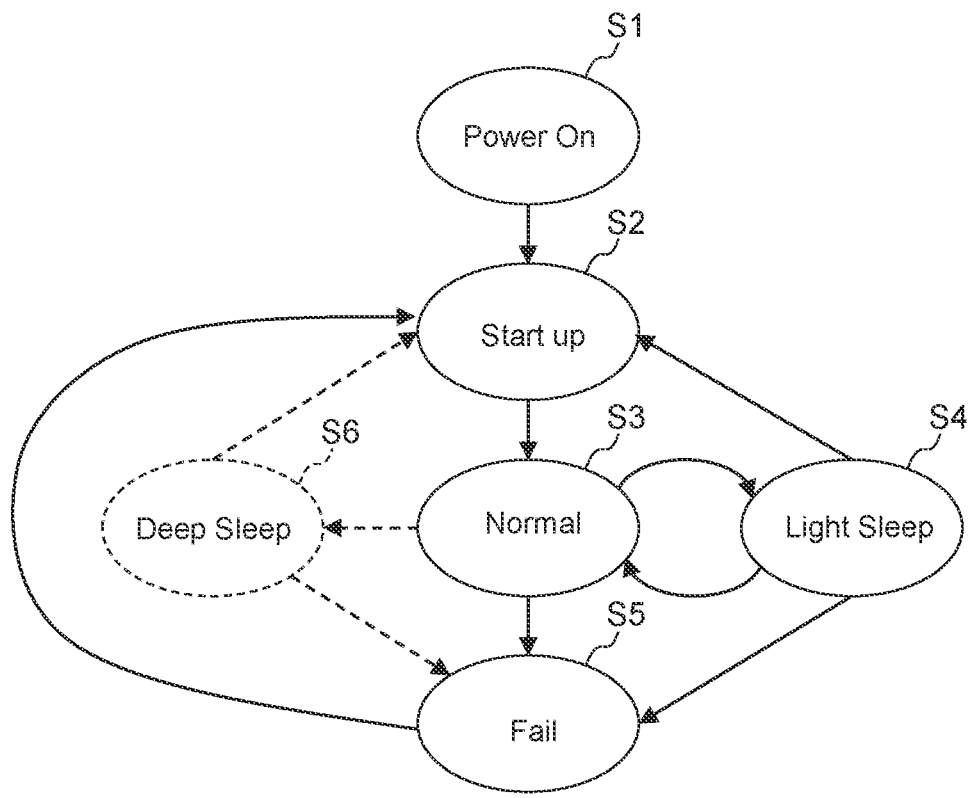
FIG. 3 is a state transition diagram of the communications system conforming to the ASA standard.

FIG. 3 is a state transition diagram of the communications system 1 conforming to the ASA standard. FIG. 3 shows the schematic state transition of the communications system 1, which is not the state transition diagram itself described in the ASA standard. The states of the Root device (10) and the Leaf device (20) shown in FIG. 1 change in accordance with the state transition diagram of FIG. 3. As shown in FIG. 3, the communications system 1 conforming to the ASA standard has a startup state (first state) S2, a normal state (second state) S3, a light sleep state (third state) S4, a fail state S5, and a deep sleep state (fourth state) S6. As described above, the light sleep state is a state in which the communication is temporarily stopped at time intervals longer than the TDD switching time and shorter than the time during when the synchronization between devices can be maintained. More succinctly, the light sleep state is a state in which the communication is intermittently stopped without losing the establishment of the synchronization.

When the Root device (10) and the Leaf device (20) are powered on (S1), both the devices transition to the startup state S2. The startup state is a state in which synchronization establishment processing is performed between the Root device (10) and the Leaf device (20) connected to each other in order to start TDD communication.

When the synchronization establishment processing of the Root device (10) and the Leaf device (20) is finished, the Root device (10) and the Leaf device (20) transition to the normal state S3. In the normal state, the Root device (10) and the Leaf device (20) alternately transform/receive information to/from each other by the TDD communication method.

The Root device (10) and the Leaf device (20) transition from the normal state to the light sleep state in some cases. When transitioning to the light sleep state, an operation of stopping the TDD communication for a set period of approximately 100 ms and returning to the normal state when the set period elapses is repeated. Alternatively, in the case where the Root device (10) and the Leaf device (20) cannot transition from the light sleep state to the normal state, they return to the startup state and the synchronization establishment processing is performed again between the Root device (10) and the Leaf device (20).

When a TDD communication error continuously occurs in the normal state or the light sleep state, the Root device (10) and the Leaf device (20) transition to the fail state. After that, the Root device (10) and the Leaf device (20) transition from the fail state to the startup state, and the synchronization establishment processing is performed again between the Root device (10) and the Leaf device (20).

Figure 4:
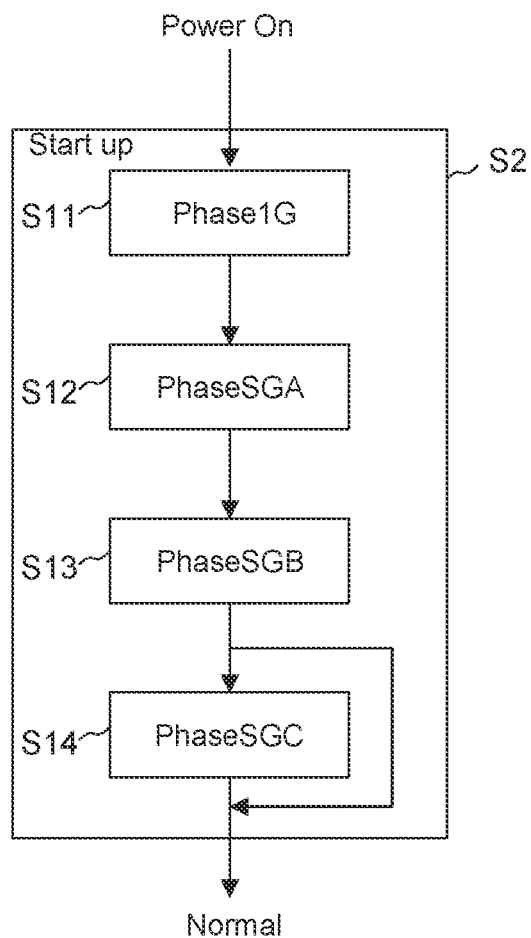
FIG. 4 is a flowchart showing a processing procedure of a startup sequence performed when a Root device and a Leaf device are in a startup state.

FIG. 4 is a flowchart showing a processing procedure of a startup sequence performed when the Root device (10) and the Leaf device (20) are in the startup state. First, synchronization of a clock signal of 1 GHz is established between the Root device (10) and the Leaf device (20) (Step S11). Herein, this clock signal is referred to as a Phase 1G signal (second signal).

Next, synchronization of a TDD cycle is established (Step S12). In Step S12, the Root device (10) and the Leaf device (20) transmit/receive a Phase SGA signal to/from each other.

Next, the signal interval between the Down link and the Up link within one TDD cycle is made the same as that in the normal state to establish TDD communication (Steps S13 and S14). After that, the Root device (10) and the Leaf device (20) transition to the normal state and start TDD communication with each other. Herein, Step S11, Step S12, Step S13, and Step S14 are respectively referred to as Phase 1G processing, Phase SGA processing, Phase SGB processing, and Phase SGC processing.

Figure 5:
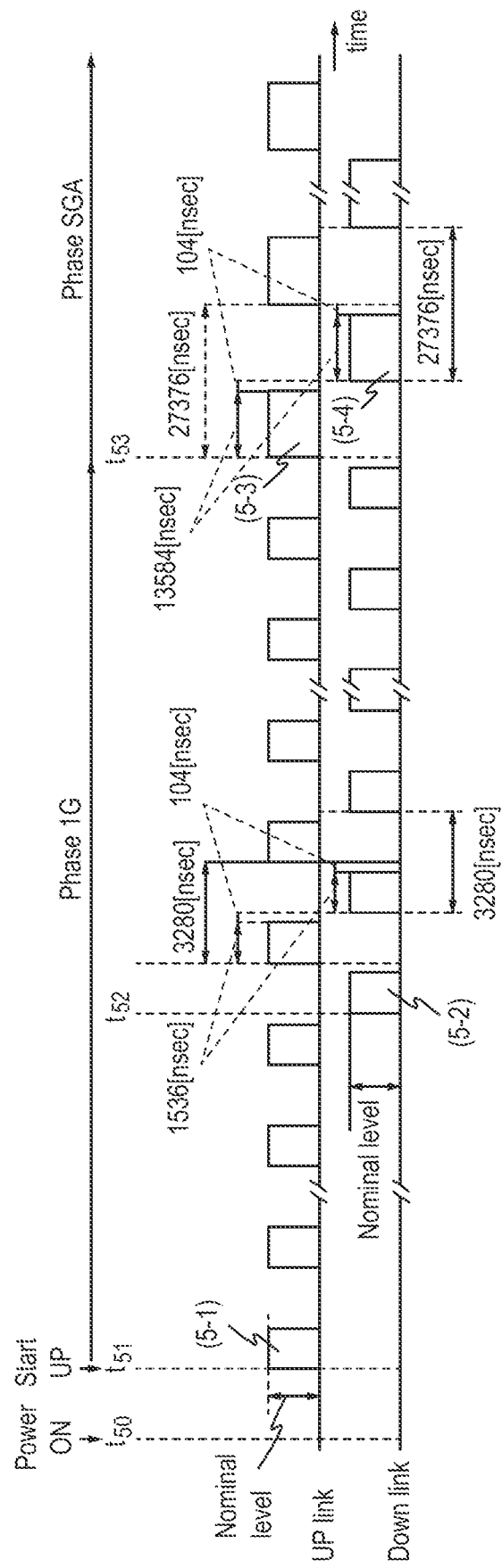
FIG. 5 is a timing diagram of the startup sequence.

FIG. 5 is a timing diagram of the startup sequence. FIG. 5 illustrates the timing of a Phase 1G signal and a Phase SGA signal transmitted via the Up link and the Down link when the processing of Steps S11 and S12 in FIG. 4 is performed. At the time t50, the Root device (10) and the Leaf device (20) are powered on and initial settings and the like are performed in each device. After the initial settings, the Leaf device (20) enters a stand-by state for receiving a Phase 1G signal transmitted from the Root device (10).

The Root device (10) outputs a Phase 1G signal to the Up link from the time t51 when the time period necessary for the initial settings and the like elapsed (5-1). The Phase 1G signal is a signal of 1 GHz, which includes a specific pattern including a control signal followed by a predetermined pseudo-random bit sequence (PRBS) signal. One signal interval in which the Phase 1G signal is output is 1536 [nsec]. The Root device (10) repeatedly transmits a Phase 1G signal in a cycle of 3280 [nsec] including the one signal interval.

The Leaf device (20) receives the Phase 1G signal output from the Root device (10) and then transmits, upon entering capable of outputting a Phase 1G signal, a Phase 1G signal (third signal) after 104 [nsec] elapses from when one signal interval of the Phase 1G signal of the Root device (10) was finished (5-2).

As shown in FIG. 5, the Root device (10) and the Leaf device (20) alternately transmit/receive a Phase 1G signal to/from each other and use the corresponding received Phase 1G signal to perform clock synchronization of the Phase 1G signals to be transmitted. The Root device (10) and the Leaf device (20) write, when the clock synchronization is completed in each device and a Phase 1G signal can be correctly received, information indicating that the preparation for proceeding to the Phase SGA in Step S12 in FIG. 4 was completed to the control signal included in the Phase 1G signal to be transmitted and transmit the respective Phase 1G signals.

When it can be confirmed, by the control signals included in the Phase 1G signals received at the same time while both the Root device (10) and the Leaf device (20) themselves are capable of correctly receiving a Phase 1G signal, that also the communication partner correctly received a Phase 1G signal, the processing proceeds from Step S11 to Step S12 in FIG. 4 (time t53).

When proceeding to Step S12 in FIG. 4, the Root device (10) outputs a Phase SGA signal (5-3) to the Up link. The Phase SGA signal is a signal that includes a specific pattern including a control signal followed by a predetermined PRBS signal, and one signal interval is 13584 [nsec]. The Root device (10) repeatedly transmits a Phase SGA signal in a cycle of 27376 [nsec] including the one signal interval.

In Step S12, the Leaf device (20) starts outputting a Phase SGA signal after 104 [nsec] elapses from when one signal interval of the Phase SGA signal output by the Root device (10) was finished (5-4).

As shown in FIG. 5, the Root device (10) and the Leaf device (20) alternately transmit/receive a Phase SGA signal to/from each other and perform, using the corresponding received Phase SGA signal, training of a reception equalizer and synchronization of a TDD cycle.

As shown in FIG. 4, the processing of Step S13 is performed after the processing of Step S12, and the Root device (10) and the Leaf device (20) transition to the normal state S3 after the processing in the startup state is finished.

Incidentally, the state transition diagram of FIG. 3 includes the deep sleep state S6. The deep sleep state S6 is a state in which a device in the communications system 1 forming to the ASA standard pauses the operation for a period sufficiently longer than that in the light sleep state S4. However, the current ASA standard version 1.01 does not determine the details of the operation in the deep sleep state.

Meanwhile, the Leaf device (20) shown in FIG. 1 is, for example, a display and the Root device (10) is, for example, a video player, assumption is made that a user touches the screen of the display to start the communications system 1 and views the video during the pause of the communications system 1. In this case, the Leaf device (20) that is a display is desired to start the Root device (10) that is a video player by some means.

Further, in the case where the Leaf device (20) is, for example, a camera module, assumption is made that when only a camera unit operates to detect some image, the Leaf device (20) requests the Root device (10) to start in order to notify the Root device (10) of the detection. For example, assumption is made that when a surveillance camera detects a face, skin color, or the like from image data of a certain region to determine that a human has approached an object to be monitored, the surveillance camera starts the communications system 1 to cause the communications system 1 to decide what to do in the future. However, the current ASA standard version 1.01 does not define a processing procedure of starting the Root device (10) by the Leaf device (20) in the deep sleep state.

In this regard, the communication device and the communications system 1 according to an embodiment of the present disclosure are characterized in that the above-mentioned problems can be solved.

First Embodiment

A communication device and a communications system 1 according to a first embodiment have a block configuration similar to that in FIG. 1. Both the Root device (10, a first communication device) and the Leaf device (20, a second communication device) in FIG. 1 corresponds to the communication device according to the first embodiment.

Figure 6:
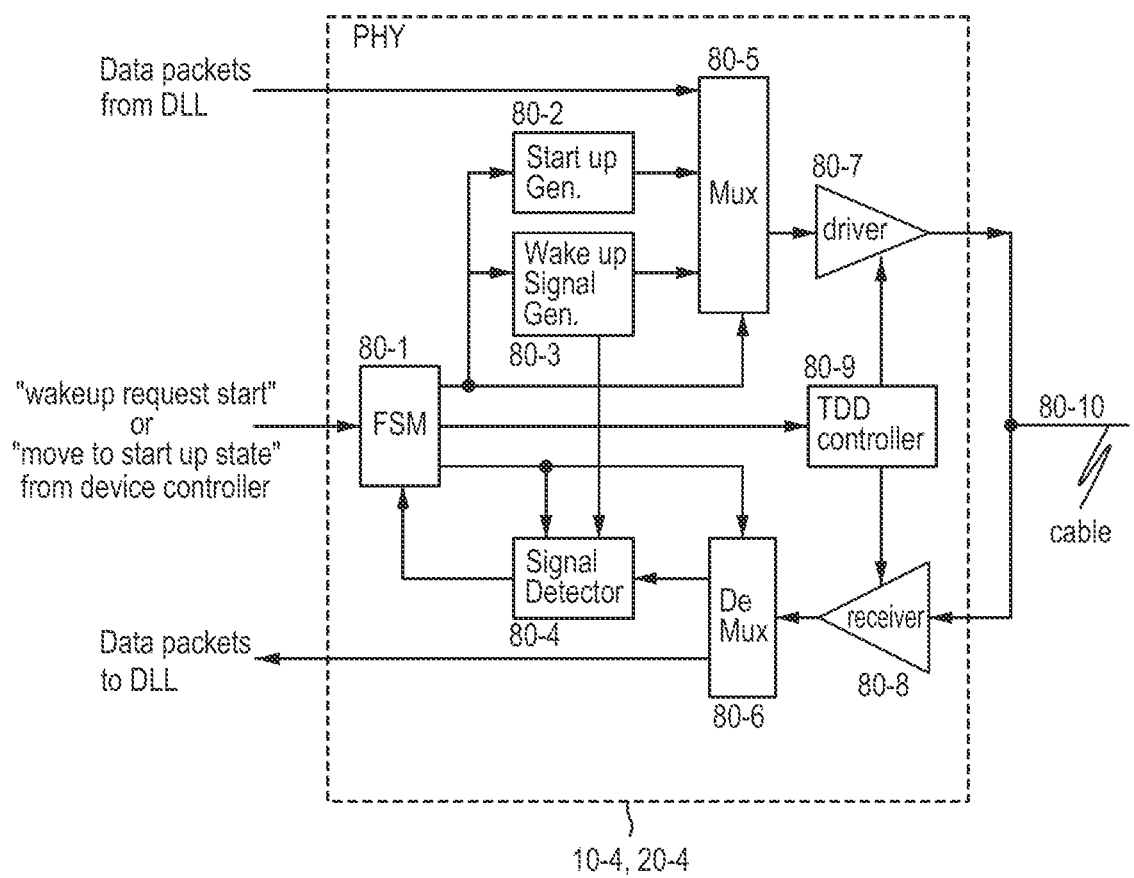
FIG. 6 is a block diagram showing an internal configuration of a PHY unit in the Root device and a PHY unit in the Leaf device in FIG. 1.

FIG. 6 is a block diagram showing internal configurations of the PHY unit (10-4) in the Root device (10) and the PHY unit (20-4) in the Leaf device (20) in FIG. 1. As shown in FIG. 6, the PHY units (10-4) and (20-4) of both the devices are similarly configured. The PHY units (10-4) and (20-4) in FIG. 6 each have a configuration assuming that a wakeup request signal (first signal) is received from another communication device (the Root device (10) or the Leaf device (20)). The timing diagram of the wakeup request signal will be described below. FIG. 6 shows a block configuration relating to a wakeup sequence in the PHY units (10-4) and (20-4).

The PHY units (10-4) and (20-4) in FIG. 6 each include a state machine unit (FSM, a state-switching control unit) (80-1), a startup generation unit (start up Gen, a second communication control unit, 80-2), a wakeup signal generation unit (Wakeup Signal Gen, a first communication control unit, 80-3), a signal detector (80-4), a multiplexer (Mux, 80-5), a demultiplexer (DeMux, 80-6), a TDD controller 80-9, a driver (80-7), and a receiver (80-8).

The FSM (80-1) is a state machine and controls a wakeup sequence in accordance with FIG. 3, and FIG. 9 and FIG. 10 described below. A wakeup request start command or a startup state transition command is input from a communication partner device to the FSM (80-1).

The startup generation unit (80-2) generates a signal necessary for the startup sequence shown in FIG. 4 and outputs the generated signal to the multiplexer (80-5).

The wakeup signal generation unit (80-3) generates a wakeup request signal described below and outputs the generated wakeup request signal to the multiplexer (80-5).

The multiplexer (80-5) selects, on the basis of the control signal from the FSM (80-1), a data packet output from the DLL unit (10-3, 20-3), a signal output from the startup generation unit (80-2), or a wakeup request signal output from the wakeup signal generation unit (80-3), and outputs the selected one to the driver (80-7). The driver (80-7) outputs the signal selected by the multiplexer (80-5) to a cable (80-10) in accordance with an instruction from the TDD controller (80-9).

More specifically, the driver (80-7) outputs the signal selected by the multiplexer (80-5) to a counter device via the cable (80-10) by the TDD communication method shown in FIG. 2. Note that the cable (80-10) connects the Root device (10) and the Leaf device (20) shown in FIG. 1 to each other.

The receiver (80-8) receives, via the cable (80-10), a signal output from the counter device. The demultiplexer (80-6) outputs the signal received by the receiver (80-8) to the signal detector (80-4) or the DLL unit (10-3, 20-3) in accordance with control from the FSM (80-1). More specifically, the demultiplexer (80-6) outputs a data packet that is a reception signal to the signal detector (80-4) in the case of the startup state S2 or the deep sleep state S6 and to the DLL unit (10-3, 20-3) in the case of the normal state S3, the light sleep state S4, or the fail state S5.

The signal detector (80-4) detects a Phase 1G signal or a wakeup request signal received via the cable (80-10), the receiver (80-8), and the demultiplexer (80-6) and outputs the detection result to the FSM (80-1).

As will be described below, the state machine unit (80-1) controls switching between a startup state, a normal state, a light sleep state, and a deep sleep state with respect to the Root device (10). The wakeup signal generation unit (80-3) repeats, in a first cycle, an operation of continuously transmitting a wakeup request signal to the Root device (10) within a first signal interval in the deep sleep state. The startup generation unit (80-2) transmits, upon receiving a Phase 1G signal output from the Root device (10) in response to the wakeup request signal, a Phase 1G signal synchronized with the Phase 1G signal to the Root device (10). The state machine unit (80-1) causes, when the startup generation unit (80-2) transmits the Phase 1G signal, the state to transition from the deep sleep state to the startup state.

The wakeup sequence performed by the Leaf device (20) and the Root device (10) will be described below assuming that the entire communications system 1 is in the deep sleep state S6. In the deep sleep state S6, although the entire communications system 1 is powered on, the communication between the Root device (10) and the Leaf device (20) is stopped.

Figure 7:
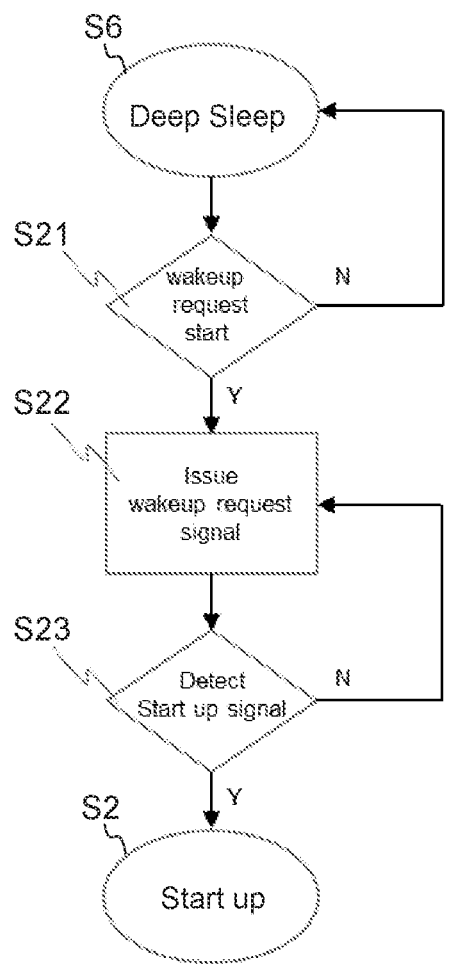
FIG. 7 is a flowchart showing a processing procedure of a wakeup sequence performed by the Leaf device.

FIG. 7 is a flowchart showing a processing procedure of the wakeup sequence performed by the Leaf device (20). A controller (not shown) in the Leaf device (20) in the deep sleep state transmits a wakeup request start command to the FSM (80-1) in order to transition to the normal state (Yes in S21).

The FSM (80-1) of the Leaf device (20) issues a wakeup request signal in response to this command (S22). More specifically, the FSM (80-1) controls the wakeup signal generation unit (80-3) to generate a wakeup request signal in one signal interval. Further, the FSM (80-1) controls the multiplexer (80-5) to cause the multiplexer (80-5) to select the wakeup request signal generated by the wakeup signal generation unit (80-3). Further, the FSM (80-1) controls the TDD controller (80-9). As a result, the TDD controller (80-9) controls the driver (80-7) to output a wakeup request signal in one signal interval to the cable (80-10) (S22).

The signal detector (80-4) performs an operation of detecting a Phase 1G signal output from the Root device (10) within a period other than the one signal interval of the wakeup request signal output by itself. The signal detector (80-4) outputs the detection result to the FSM (80-1).

The FSM (80-1) of the Leaf device (20) determines, in the case of detecting a Phase 1G signal from the Root device (10), that the Root device (10) has transitioned to the startup state S2, and the Leaf device (20) also transitions to the startup state S2 (Yes in S23). After that, the startup sequence shown in FIG. 4 is executed.

As described above, when the Leaf device (20) outputs a wakeup request signal to the cable (80-10) and then receives a Phase 1G signal from the Root device (10), the Leaf device (20) transitions from the deep sleep state to the startup state.

The FSM (80-1) of the Leaf device (20) determines, in the case where no Phase 1G signal has been detected, that the Root device (10) is in the deep sleep state S6, and repeats the processing of S22 and subsequent Steps in order to transmit a wakeup request signal again (NO in S23). As a result, the Leaf device (20) periodically outputs a wakeup request signal until a Phase 1G signal from the Root device (10) is received.

Figure 8:
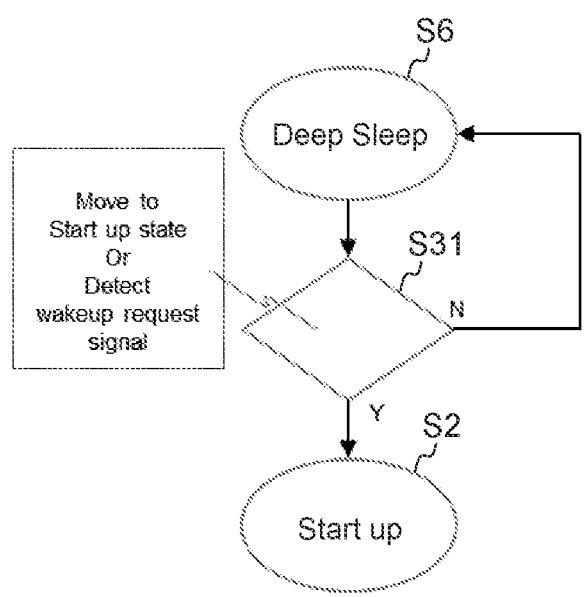
FIG. 8 is a flowchart showing a processing procedure of a wakeup sequence performed by the Root device.

FIG. 8 is a flowchart showing a processing procedure of the wakeup sequence performed by the Root device (10). In the case where the Root device (10) is in the deep sleep state S6, the Root device (10) instructs, from the ECU (10-1) in FIG. 1, the FSM (80-1) to stand by for an input of a startup state transition ("move to start up state") command. At this time, the signal detector (80-4) is in a detection operation state for a wakeup request signal.

When a startup state transition command is input to the FSM (80-1) or the signal detector (80-4) detects a wakeup request signal, the FSM (80-1) immediately transitions from the deep sleep state S6 to the startup state S2 (Yes in S31). After that, the startup sequence shown in FIG. 4 is executed.

In the case where no startup state transition command is input to the FSM (80-1) and the signal detector (80-4) does not detect a wakeup request signal in S31, the deep sleep state S6 is maintained. The FSM (80-1) stands by for an input of a startup state transition command and the signal detector (80-4) continuously performs an operation of detecting a wakeup request signal.

The procedure described above realizes a wakeup operation from the Leaf device (20) in the communications system 1 in which the Root device (10) and the Leaf device (20) shown in FIG. 1 are connected to each other.

Figure 9:
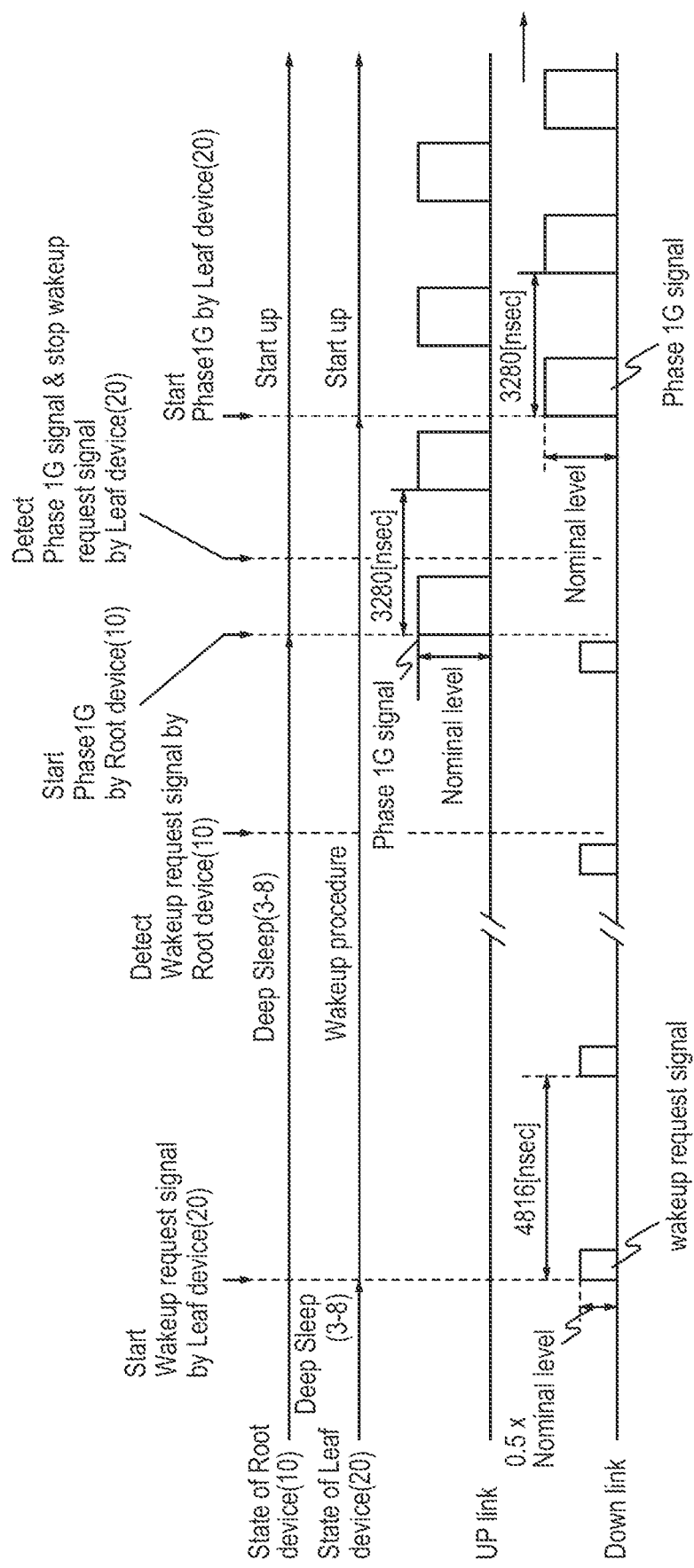
FIG. 9 is a timing diagram of the wakeup sequence.
Figure 10:
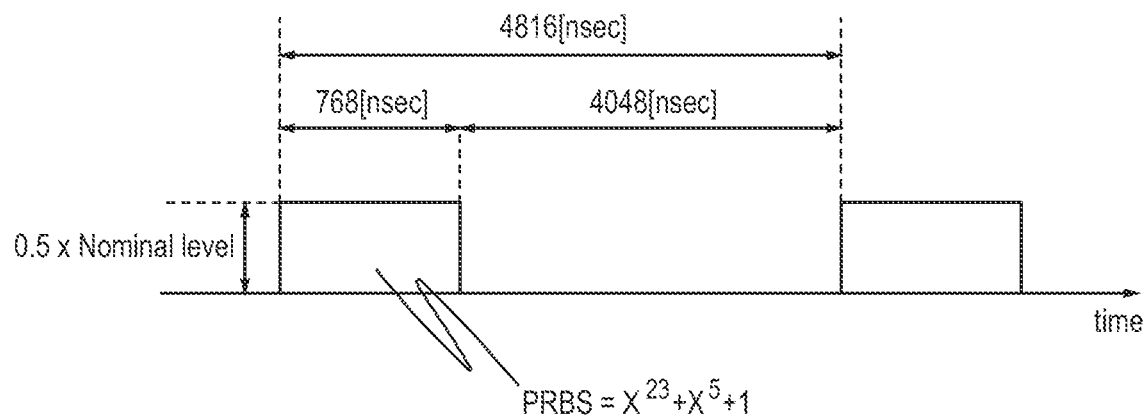
FIG. 10 is a timing diagram of a wakeup request signal.
Figure 11:
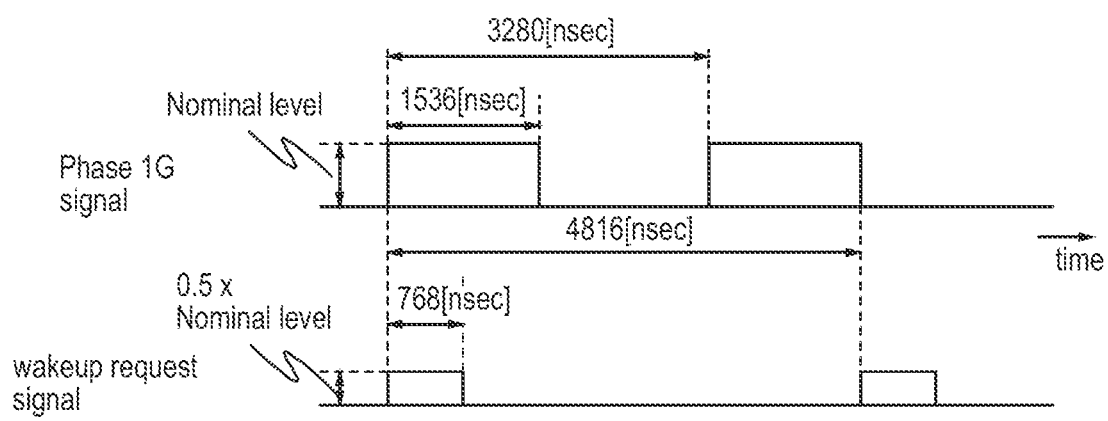
FIG. 11 is a timing diagram showing a relationship between the wakeup request signal and a Phase 1G signal.

FIG. 9 is a timing diagram of a wakeup sequence, FIG. 10 is a timing diagram of a wakeup request signal, and FIG. 11 is a timing diagram showing a relationship between the wakeup request signal and a Phase 1G signal. FIG. 9 shows the timing at which the Leaf device (20) outputs a wakeup request signal while the entire communications system 1 is in the deep sleep state.

As shown in FIG. 10, the wakeup request signal generated by the wakeup signal generation unit (80-3) in FIG. 6 includes an PRBS signal represented by a polynomial of $X^{23}+X^{5}+1$, and the highest frequency is nominally 1 GHz. In the wakeup request signal, an operation of stopping after outputting an PRBS signal in one signal interval of 768 [nsec] and outputting an PRBS signal again in one signal interval of 768 [nsec] after 4048 [nsec] elapses is repeated. As described above, the wakeup request signal is a cycle signal that repeatedly outputs an PRBS signal in one signal interval of 768 [nsec] in a cycle of 4816 [nsec].

As shown in FIG. 9 and FIG. 10, the Leaf device (20) in the deep sleep state periodically outputs the above-mentioned wakeup request signal to the cable (80-10). This wakeup request signal is transmitted by the Down link of the TDD communication method to the Root device (10) via the cable (80-10). The Leaf device (20) periodically transmits a wakeup request signal until a Phase 1G signal from the Root device (10) is received. The Leaf device (20) immediately stops, upon receiving a Phase 1G signal, the transmission of a wakeup request signal.

As shown in FIG. 9 and FIG. 11, the Root device (10) outputs, upon receiving a wakeup request signal, a Phase 1G signal to the cable (80-10) in one signal interval of 1536 [nsec] in a cycle of 3280 [nsec]. This Phase 1G signal is transmitted by the Up link of the TDD communication method to the Leaf device (20) via the cable (80-10).

As shown in FIG. 11, the signal amplitude of the wakeup request signal is equal to or less than the signal amplitude of the Phase 1G signal. It is desirable that the signal amplitude of the wakeup request signal is 0.2 times or more and 0.8 times or less the signal amplitude of the Phase 1G signal. It is more desirable that the signal amplitude of the wakeup request signal is 0.4 times or more and 0.6 times or less the signal amplitude of the Phase 1G signal. It is further more desirable that the signal amplitude of the wakeup request signal is 0.5 times the signal amplitude of the Phase 1G signal. As described above, by making the signal amplitude of the wakeup request signal smaller than the signal amplitude of the Phase 1G signal, it is possible to prevent electrical adverse effects such as breakage of the circuit components in the Root device (10) and the Leaf device (20) even if both signals are transmitted/received at the same time.

Further, as shown in FIG. 11, when the Root device (10) outputs a Phase 1G signal in response to the wakeup request signal from the Leaf device (20), a time domain in which the wakeup request signal and the Phase 1G signal do not overlap with each other in time is provided. As a result, the Leaf device (20) is capable of easily detecting a Phase 1G signal and the Root device (10) is capable of easily detecting a wakeup request signal.

As shown in FIG. 9, the Leaf device (20) transitions, upon receiving the Phase 1G signal from the Root device (10), to the startup state by outputting a Phase 1G signal of the same signal level in synchronization with the received Phase 1G signal.

Figure 12:
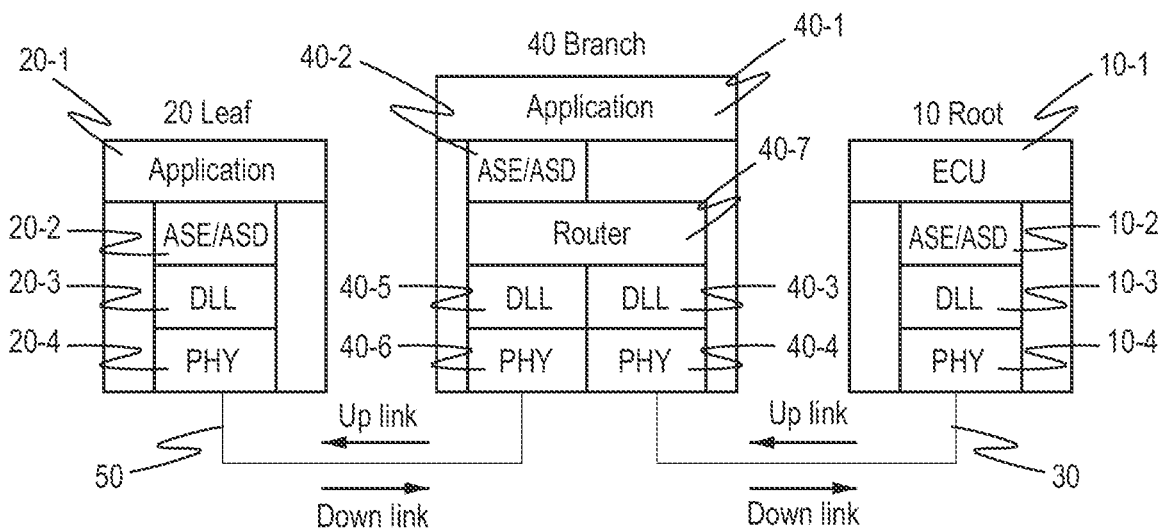
FIG. 12 is a block diagram showing a schematic configuration of a communications system 1a including the Root device, the Leaf device, and a Branch device.

Incidentally, in the ASA standard, assumption is also made that the Root device (10) and the Leaf device (20) are connected to each other via a Branch device (40). FIG. 12 is a block diagram showing a schematic configuration of a communications system 1a that includes the Root device (10), the Leaf device (20), and the Branch device (40). The internal configurations of the Root device (10) and the Leaf device (20) in FIG. 12 are the same as those in FIG. 1. The Branch device (40) in FIG. 12 includes an Application unit (40-1), an ASE/ASD unit (40-2), a router (40-7), a plurality of DLL units (40-3) and (40-4), and a plurality of PHY units (40-4) and (40-6). Assumption is made that in the communications system 1a in FIG. 12, the Root device (10) recognize in advance that the Leaf device (20) and the Branch device (40) transmit a wakeup request signal in some cases.

Figure 13:
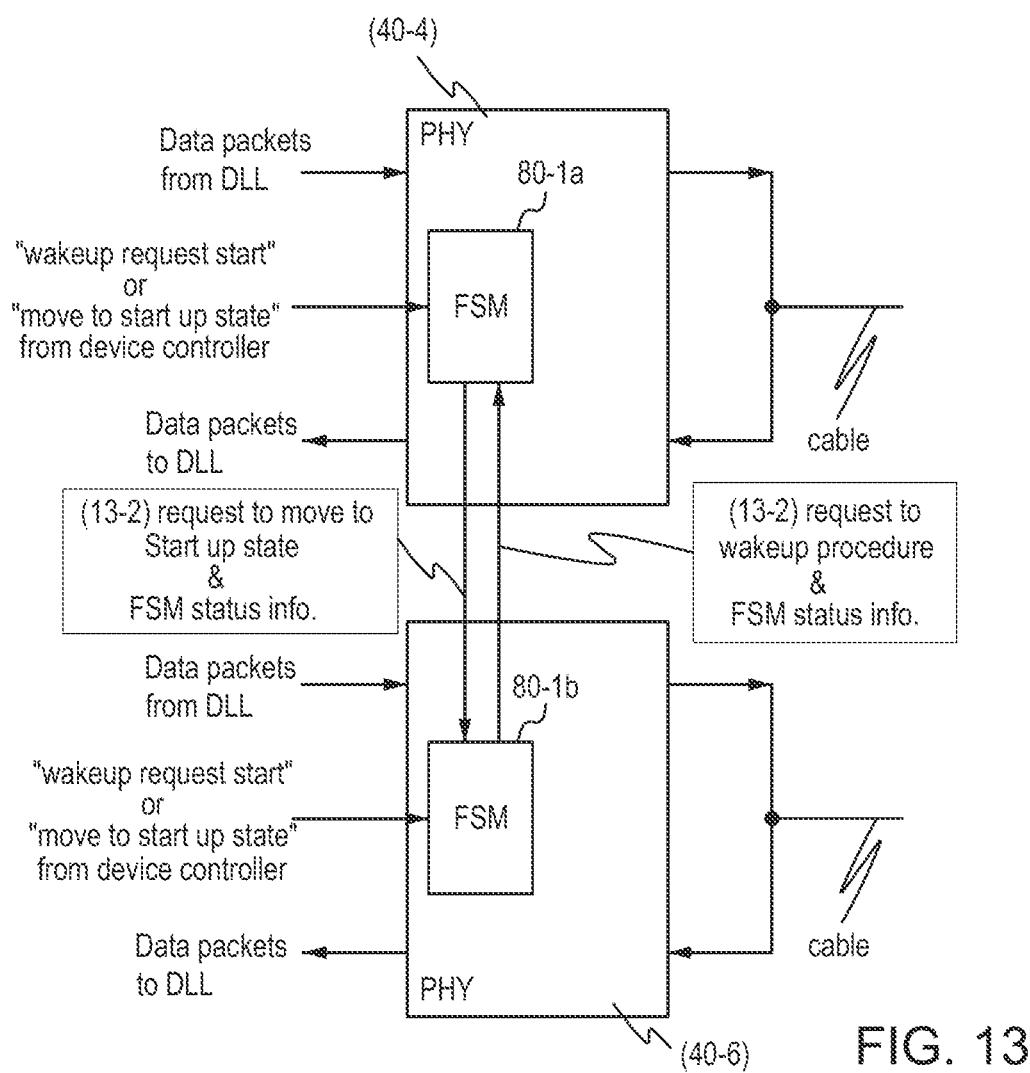
FIG. 13 is a block diagram showing internal configurations of a plurality of PHY units.

FIG. 13 is a block diagram showing internal configurations of the plurality of PHY units (40-4) and (40-6). As shown in FIG. 13, the PHY unit (40-4) includes an FSM (80-1a, a first state-switching control unit), and the PHY unit (40-6) includes an FSM (80-1b, a second state-switching control unit). A wakeup request start command or a startup state transition command from the Root device (10) is input to the FSM (80-1a). A wakeup request start command or a startup state transition command from the Leaf device (20) is input to the FSM (80-1b). Note that although illustration of the components other than the FSM (80-1a) and the FSM (80-1b) is omitted in FIG. 13, the PHY unit (40-4) and the PHY unit (40-6) have internal configurations similar to those in FIG. 6.

The FSM (80-1a) in the PHY unit (40-4) and the FSM (80-1b) in the PHY unit (40-6) transmit/receive information to/from each other. Specifically, the FSM (80-1b) in the PHY unit (40-6) notifies the FSM (80-1a) in the PHY unit (40-4) of that a wakeup request start command from the Leaf device (20) has been received and of the state of the Leaf device (20) (13-1). The FSM (80-a) in the PHY unit (40-4) notifies the FSM (80-1b) in the PHY unit (40-6) of a request for transitioning to a startup state and of the state of the Root device (10) (13-2).

The router (40-7) determines the transmission destination of a transmission packet, determines whether or not the packet is a packet for the Branch device (40) itself or a packet to be transmitted for another device, and transmits encapsulated information to the DLL unit (40-3), the DLL unit (40-5), or the ASE/ASD unit (40-2).

Even in the case where the Branch device (40) is connected between the Root device (10) and the Leaf device (20) as shown in FIG. 12, each device performs the state transition in FIG. 3. The case where the Leaf device (20) is in the deep sleep state is a case where the entire communications system 1a is in the deep sleep state or a case where the state between the Root device (10) and the Branch device (40) is the normal state or the light sleep state and the state between the Branch device (40) and the Leaf device (20) is the deep sleep state. As described above, the case where the Leaf device (20) is in the deep sleep state is assumed to be one of the above-mentioned two cases. In either case, it is necessary to cause the Leaf device (20) to be capable of spontaneously returning from the deep sleep state to the normal state.

A processing procedure of the wakeup operation performed by the Leaf device (20) in the case where the Root device (10) and the Leaf device (20) are connected to each other via the Branch device (40) shown in FIG. 12 will be described below separately for the above-mentioned two cases.

As described above, the Branch device (40) shown in FIG. 12 includes PHYs and DLLs of two systems. The PHY unit (40-6) and the DLL unit (40-5) are of one system, and the PHY unit (40-4) and the DLL unit (40-3) are of the other system. Now, the PHY unit (40-6) connected to the Leaf device (20) is referred to as the Far side PHY, and the PHY unit (40-4) connected to the Root device (10) is referred to as the Near side PHY.

The FSM (80-1a) controls switching between the startup state, the normal state, the light sleep state, and the deep sleep state with respect to the Root device (10). The FSM (80-1b) controls switching between the startup state, the normal state, the light sleep state, and the deep sleep state with respect to the Leaf device (20).

The PHY unit (40-4) transmits, upon repeatedly receiving, in a first cycle, a wakeup request signal continuously transmitted from the Leaf device (20) in a first signal interval while the Leaf device (20) is in the deep sleep state, the received wakeup request signal to the Root device (10). The PHY unit (40-6) transmits, upon receiving a Phase 1G signal output from the Root device (10) in response to the wakeup request signal, the Phase 1G signal to the Leaf device (20). The FSM (80-1a) transitions from the deep sleep state to the startup state upon transmitting the Phase 1G signal from the Root device (10).

Figure 14:
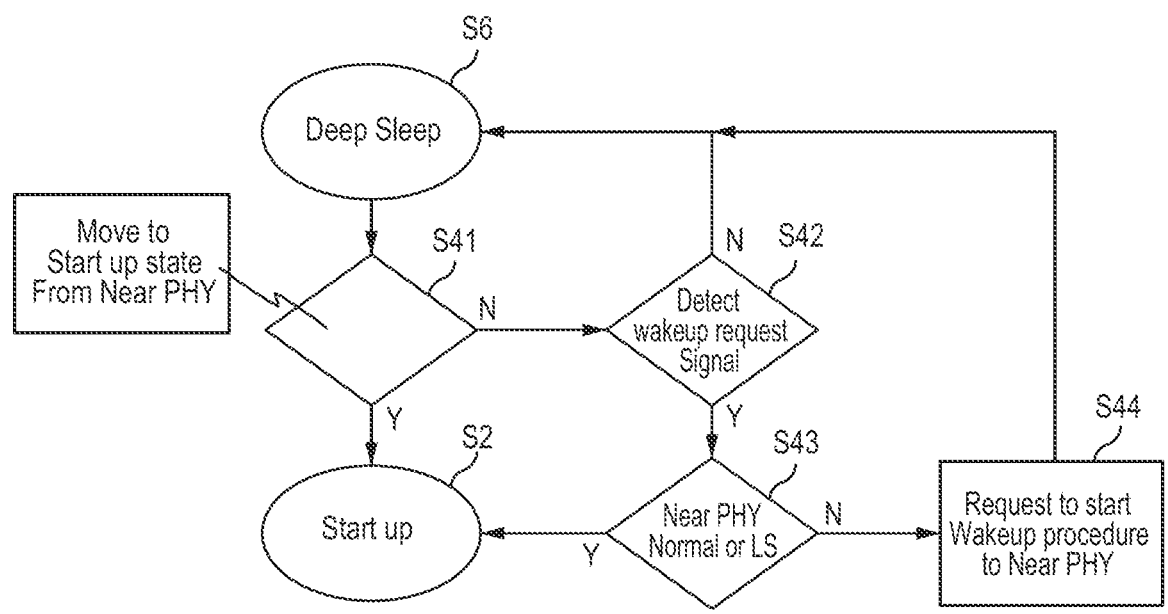
FIG. 14 is a flowchart showing a processing procedure of a PHY unit that is a Far side PHY.
Figure 15:
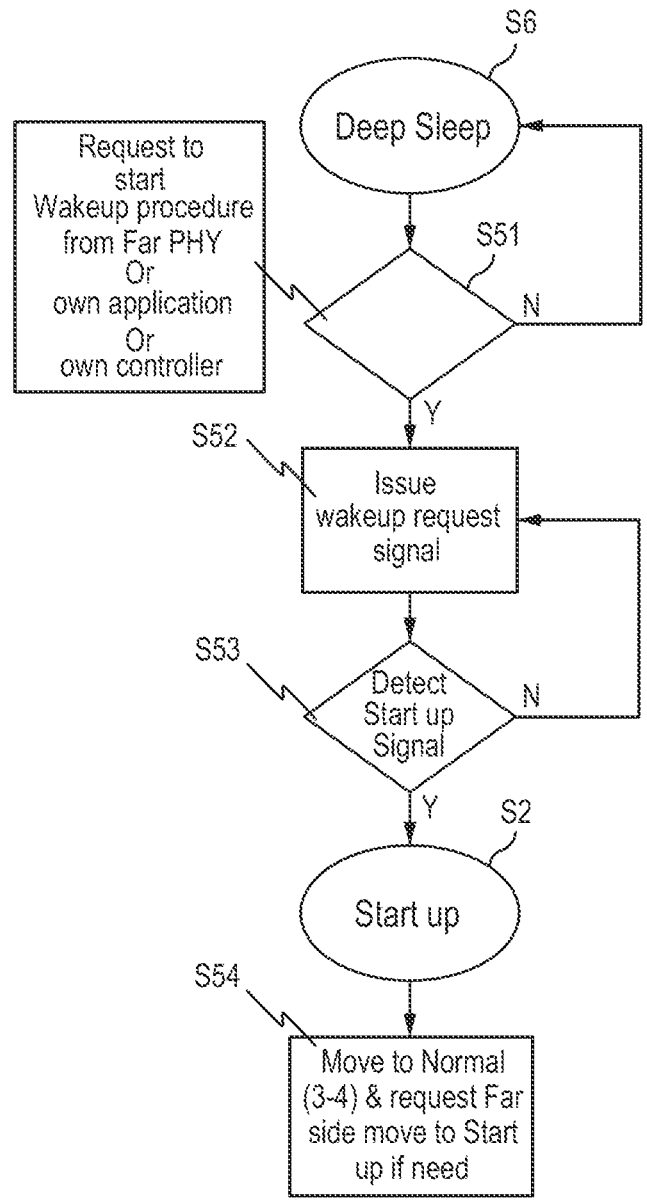
FIG. 15 is a flowchart showing a processing procedure of a PHY unit that is a Near side PHY.

FIG. 14 is a flowchart showing a processing procedure of the PHY unit (40-6) that is the Far side PHY, and FIG. 15 is a flowchart showing a processing procedure of the PHY unit (40-4) that is the Near side PHY. The PHY unit (40-4) and the PHY unit (40-6) have the internal configurations shown in FIG. 13.

A case where the Leaf device (20) performs a wakeup operation while all the devices are in the deep sleep state will be described first. Since the Leaf device (20) executes the above-mentioned operation according to the flowchart of FIG. 7, description thereof is omitted.

In the case where a wakeup request signal from the Leaf device (20) has been received (Yes in S42) while the Far Side PHY of the Branch device (40) is in the deep sleep state, the signal detector (80-4) of the Far Side PHY checks the state of the Near side PHY (13-2 in FIG. 13).

In the case where the state of the Near side PHY is the normal state S3 or the light sleep state S4 (Yes in S43), the startup operation is immediately started. After that, the startup sequence in FIG. 4 is executed in a way similar to that described in the Root device (10). As described above, in the case where the Root device (10) is in the normal state S3 or the light sleep state S4 when a wakeup request signal from the Leaf device (20) has been received, the Branch device (40) immediately transitions from the deep sleep state to the startup state.

Meanwhile, in the case where the state of the Near side PHY is not the normal state S3 or the light sleep state S4 (No in S43) when a wakeup request signal from the Leaf device (20) has been received, the Near Side PHY is instructed to start a wakeup operation for establishing communication with the Root device (10) (13-1 in FIG. 13) (S44). In this case, the Branch device (40) maintains the deep sleep state S6 until the communication between the Near Side PHY and the Root device (10) is established.

In the case where the Near side PHY transitions to the normal state S3 and a startup state transition command (13-2 in FIG. 13) to the Far Side PHY has been received (Yes in S41), the Branch device (40) immediately transitions to the startup state S2. After that, the startup sequence (FIG. 4) is executed in a way similar to that described in the Root device (10). By these operations, the Leaf device (20) and the Branch device (40) perform the wakeup operation.

Next, a wakeup sequence in the case where the Near Side PHY of the Branch device (40) is in the deep sleep state will be described on the basis of the flowchart of FIG. 15. In the case where a wakeup operation start command (13-1 in FIG. 13) has been received from the Far Side PHY (Yes in S51), the Near Side PHY outputs a wakeup request signal (S52, a first communication control unit) in order to immediately establish communication with the Root device (10). This wakeup request signal is transmitted to the Root device (10) via the cable (80-10). After that, the Near Side PHY of the Branch device (40) performs an operation similar to that in FIG. 7. That is, the FSM (80-1) of the Branch device (40) determines, in the case of detecting a Phase 1G signal from the Root device (10), that the Root device (10) has transitioned to the startup state S2, and the Branch device (40) also transitions to the startup state S2 (Yes in S53).

When the Near Side PHY of the Branch device (40) established communication with the Root device (10), the Far Side PHY of the Branch device (40) is instructed to transition to the startup state S2 (13-2 in FIG. 13) and the Branch device (40) itself transitions to the normal state S3 (S54).

The processing procedure in which the Root device (10) in the deep sleep state receives a wakeup request signal from the Near side PHY of the Branch device (40) and transitions to the startup state S2 is similar to that in the flowchart of FIG. 8.

With the procedure described above, by transmitting, in the case where the Leaf device (20) shown in FIG. 12 is in the deep sleep state, a wakeup request signal from the Leaf device (20), it is possible to cause each device to transition to the startup state.

Figure 16:
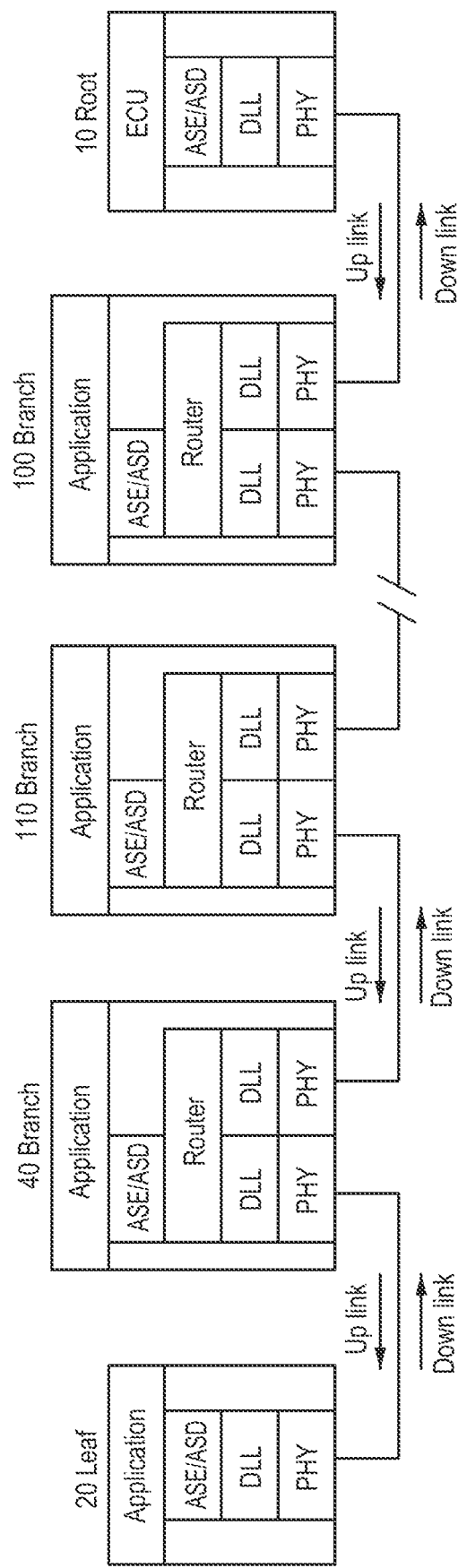
FIG. 16 is a block diagram of a communications system in which a plurality of Branch devices is daisy chained.

The above-mentioned processing procedure of the Branch device (40) can be applied to a communications system 1b in which a plurality of Branch devices (40) is daisy chained between the Root device (10) and the Leaf device (20) as shown in FIG. 16. Each of the Branch devices (40) in FIG. 16 has an internal configuration similar to that of the Branch device (40) in FIG. 12. Further, the PHY unit in each of the Branch devices (40) in FIG. 16 has an internal configuration similar to that in FIG. 13.

The Root device (10) in FIG. 16 reads, from the built-in register of each device (20, 40, 100, or 110) at the time of startup, information regarding whether or not the corresponding device is a device that supports a deep sleep state, and determines whether or not the device is capable of transitioning from the deep sleep state to another state. In the case where all the connected devices are capable of transitioning from the deep sleep state, the following processing is permitted.

In the case of performing a wakeup operation from the Leaf device (20) while all the devices are in the deep sleep state, the above-mentioned processing procedure is performed to cause the Root device (10) to transition to the startup state S2 by performing a wakeup operation in order of the Leaf device (20), the Branch device (40), the Branch devices (40), (110), . . . , the Branch device (100), and the Root device (10). As a result, the communication between the Root device (10) and each of the Branch devices (40), (110), and (100) is established and then, the communication between the Branch device (40) and the Leaf device (20) is established, thereby making it possible to finally establish the communication between the Branch device (40) and the Leaf device (20). As described above, communication with a plurality of Branch device is established in order from the Branch device closest to the Root device (10).

Further, in the case where communication between devices to the Root device (10) is desired to be established starting from the Branch device (40) in the middle of the network, e.g., the Branch device (110) in the system shown in FIG. 16, by starting a wakeup operation starting from a wakeup operation start (S51 in FIG. 15) from the own Application of the Near side PHY of the Branch device (110) shown in FIG. 15 or the controller, communication from the Branch device (110) to the Root device (10) can be established in accordance with the procedure described above.

As described above, in the communications system 1 according to the first embodiment, a wakeup request signal is repeatedly output from the Leaf device (20) while the Leaf device (20) is in the deep sleep state, the Leaf device (20) receives a Phase 1G signal transmitted from the Root device (10) that has received the wakeup request signal and then stops outputting the wakeup request signal, and a Phase 1G signal synchronized with the received Phase 1G signal is output from the Leaf device (20), thereby transitioning to the startup state. As a result, the Leaf device (20) is capable of taking action on its own to transition from the deep sleep state.

Further, in the case where the Branch device (40) is connected between the Root device (10) and the Leaf device (20), the wakeup request signal output by the Leaf device (20) is transmitted to the Root device (10) via the Branch device (40). The Branch device (40) immediately transitions to the startup state upon receiving a Phase 1G signal from the Root device (10). Further, the Branch device (40) transmits, to the Leaf device (20) via the Branch device (40), the Phase 1G signal output by the Root device (10) that has received the wakeup request signal. The Leaf device (20) is capable of stopping, upon receiving the Phase 1G signal, outputting a wakeup request signal and transitioning to the startup state.

Second Embodiment

In the communications system according to the first embodiment, as shown in FIG. 9 and FIG. 11, the signal amplitude of the wakeup request signal output by the Leaf device (20) is set to be less than (e.g., approximately 0.5 times) the signal amplitude of the Phase 1G signal output by the Root device (10) and one signal interval of the wakeup request signal is set to be less than (e.g., approximately 0.5 times) one signal interval of the Phase 1G signal. The Leaf device (20) originally has a function of generating a signal having the same signal amplitude and the same one signal interval as those of the Phase 1G signal output from the Root device (10). In addition to the function, it is necessary to provide a function of generating a wakeup request signal having a signal amplitude and one signal interval different from those of the Phase 1G signal as described above. Meanwhile, in the second embodiment, a wakeup request signal having the same signal amplitude and the same one signal interval as those of the Phase 1G signal is generated.

The communications system 1 according to the second embodiment is configured in a way similar to that in FIG. 1, FIG. 12, or FIG. 16. Further, the internal configuration of each device in the communications system 1 according to the second embodiment is similar to that in FIG. 1, FIG. 6, FIG. 12, or FIG. 13.

Figure 17:
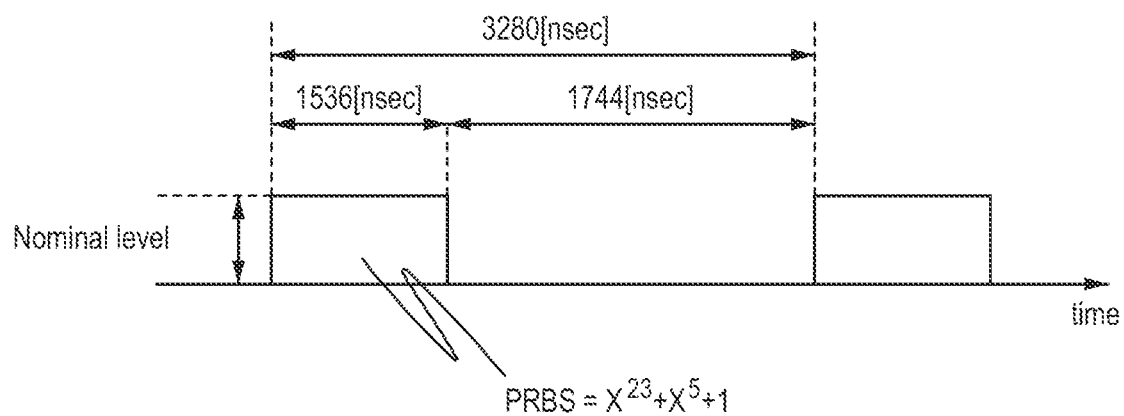
FIG. 17 is a timing diagram of wakeup of a communications system 1 according to a second embodiment.
Figure 18:
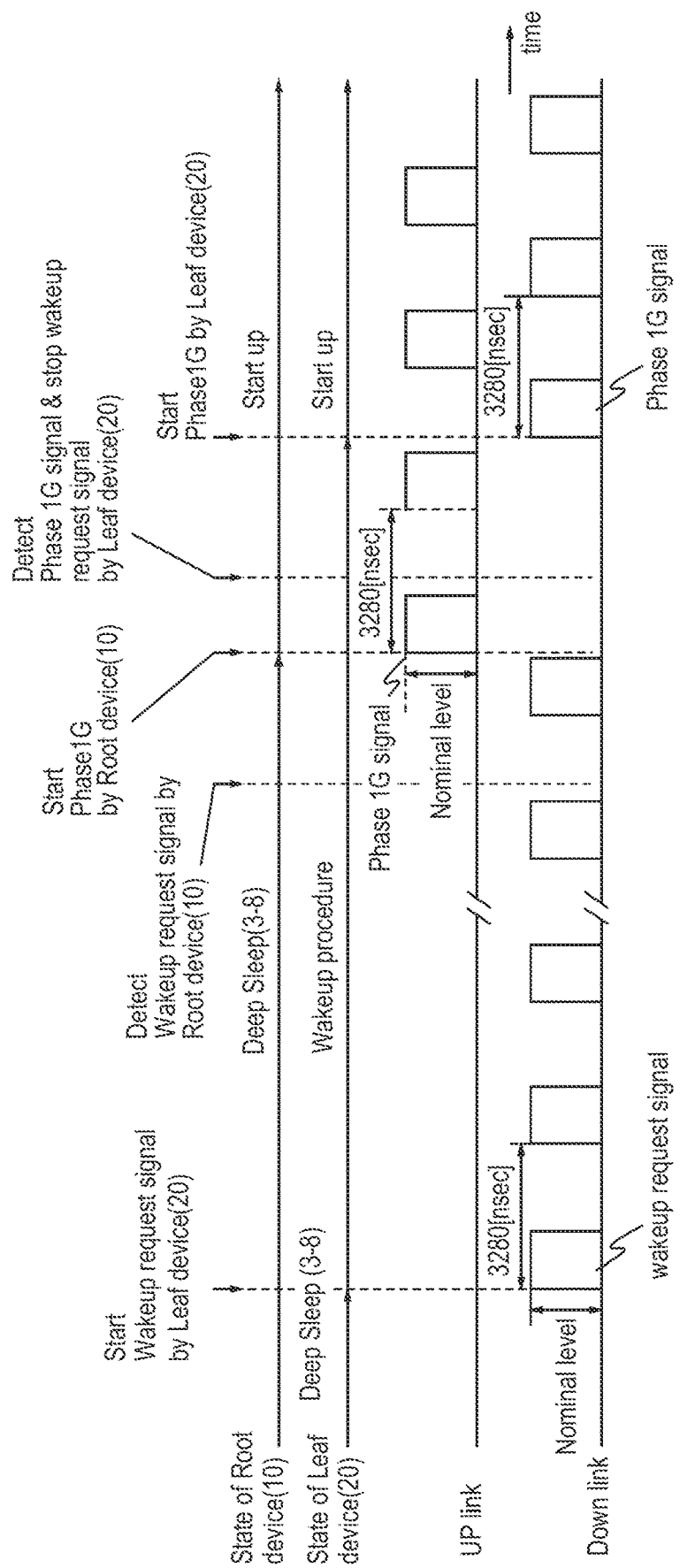
FIG. 18 is a timing diagram of a wakeup request signal.

FIG. 17 is a timing diagram of the wakeup of the communications system 1 according to the second embodiment, and FIG. 18 is a timing diagram of a wakeup request signal. The Leaf device (20) in the deep sleep state repeatedly outputs, in the same cycle as that of the Phase 1G signal generated by the Root device (10), a wakeup request signal having the same amplitude and the same one signal interval as those of the Phase 1G signal. Since the Leaf device (20) originally has the function of generating a Phase 1G signal, it is possible to easily generate a wakeup request signal having the same amplitude and the same one signal interval as those of the Phase 1G signal.

The Root device (10) recognizes, upon receiving a wakeup request signal from the Leaf device (20), that the Leaf device (20) has started a wakeup sequence, and outputs a Phase 1G signal. The wakeup request signal has the same signal amplitude and the same one signal interval as those of the Phase 1G signal, but is a signal transmitted in the deep sleep state. Therefore, the Root device (10) determines the signal as a wakeup request signal. The Root device (10)

outputs a Phase 1G signal at a timing that does not overlap with one signal interval of a wakeup request signal.

The Leaf device (20) immediately stops, upon receiving a Phase 1G signal from the Root device (10), outputting a wakeup request signal, outputs a Phase 1G signal having the same signal amplitude and the same one signal interval as those of the Phase 1G signal in synchronization with the Phase 1G signal from the Root device (10), and transitions to the startup state.

As described above, in the second embodiment, a wakeup request signal having the same signal amplitude and the same one signal interval as those of the Phase 1G signal output from the Root device (10) is output from the Leaf device (20) in the same cycle as that of the Phase 1G signal. As a result, it is easy for the Leaf device (20) to generate a wakeup request signal and it is possible to simplify the internal configuration of the Leaf device (20).

It should be noted that the present disclosure may take the following configurations.

(1) A communication device, including:
- a state-switching control unit that controls switching between a first state in which synchronization for communicating with a communication partner device is established, a second state in which the communication is started after establishing the synchronization in the first state, a third state in which the communication is intermittently stopped without losing the establishment of the synchronization, and a fourth state in which the communication is stopped for a longer time than the third state and synchronization is reestablished with the communication partner device when restarting the communication;
- a first communication control unit that repeats, in a first cycle, an operation of continuously transmitting a first signal within a first signal interval to the communication partner device in the fourth state; and
- a second communication control unit that transmits, upon receiving a second signal output from the communication partner device in response to the first signal, a third signal synchronized with the second signal to the communication partner device, in which
- the state-switching control unit switches, where the second communication control unit transmits the third signal, a state from the fourth state to the first state.

(2) A communication device, including:
- a first state-switching control unit that controls switching between a first state in which synchronization for communicating with a first communication partner device is established, a second state in which the communication is started after establishing the synchronization in the first state, a third state in which the communication is intermittently stopped without losing the establishment of the synchronization, and a fourth state in which the communication is stopped for a longer time than the third state and synchronization is reestablished with the first communication partner device when restarting the communication;
- a second state-switching control unit that controls switching between the first state, the second state, the third state, and the fourth state in communication with a second communication partner device;
- a first communication control unit that transmits, upon repeatedly receiving, in a first cycle, a first signal continuously transmitted from the second communication partner device within a first signal interval while the second communication partner device is in the fourth state, the received first signal to the first communication partner device; and
- a second communication control unit that transmits, upon receiving a second signal output from the first communication partner device in response to the first signal, the second signal to the second communication partner device, in which
- the first state-switching control unit transitions from the fourth state to the first state upon transmitting the second signal from the first communication partner device.

(3) The communication device according to (2), in which
- the second state-switching control unit causes, where the first signal from the second communication partner device has been received in the fourth state, the first communication partner device in the first state, the second state, or the third state to transition to the first state.

(4) The communication device according to any one of (1) to (3), in which
- the first communication control unit repeats, in the first cycle, an operation of continuously transmitting the first signal within the first signal interval, the first signal being generated using a pseudo-random number.

(5) The communication device according to (4), in which
- the first communication control unit generates the first signal on the basis of a polynomial of $X^{23}+X^5+1$.

(6) A communication device, including:
- a state-switching control unit that controls switching between a first state in which synchronization for communicating with a communication partner device is established, a second state in which the communication is performed after establishing the synchronization in the first state, a third state in which the communication is intermittently stopped without losing the establishment of the synchronization, and a fourth state in which the communication is stopped for a longer time than the third state and synchronization is reestablished with the communication partner device when restarting the communication;
- a first communication control unit that repeatedly receives, in a first cycle, a first signal continuously transmitted from the communication partner device within a first signal interval while the communication partner device is in the fourth state; and
- a second communication control unit that transmits, to the communication partner device, a second signal synchronized with the first signal received by the first communication control unit.

(7) The communication device according to any one of (1) to (6), in which
- the first signal has a signal amplitude that is equal to or less than a signal amplitude of the second signal.

(8) The communication device according to (7), in which
- the signal amplitude of the first signal is 0.2 times or more and 0.8 times or less the signal amplitude of the second signal.

(9) The communication device according to (8), in which
- the signal amplitude of the first signal is 0.4 times or more and 0.6 times or less the signal amplitude of the second signal.

(10) The communication device according to (9), in which
- the signal amplitude of the first signal is 0.5 times the signal amplitude of the second signal.

(11) The communication device according to any one of (1) to (10), in which the first signal interval is equal to or less than a second signal interval in which the second signal is continuously output.
(12) The communication device according to (11), in which the first signal interval is 0.5 times the second signal interval.
(13) The communication device according to any one of (1) to (12), in which
the first signal interval is 768 [nsec], and
the first cycle is 4816 [nsec].
(14) The communication device according to any one of (1) to (12), in which
the first signal interval is 1536 [nsec], and
the first cycle is 3280 [nsec].
(15) The communication device according to any one of (1) to (6), in which
the first signal and the second signal have the same signal amplitude and the same cycle, and
the first signal interval has the same length as that of a second signal interval in which the second signal is continuously output.
(16) The communication device according to (15), in which
each of the first signal interval and the second signal interval is 1536 [nsec], and
each of the first signal and the second signal has a cycle of 3280 [nsec].
(17) The communication device according to (1) or (6), in which
information is alternately transmitted/received to/from the communication partner device within a period assigned by a time division duplex (TDD) communication method.
(18) A communications system, including:
a first communication device; and
a second communication device that alternately transmits/receives information to/from the first communication device within a period assigned by a time division duplex (TDD) communication method, in which
the second communication device includes
a state-switching control unit that controls switching between a first state in which synchronization for communicating with the first communication device is established, a second state in which the communication is performed after establishing the synchronization in the first state, a third state in which the communication is intermittently stopped without losing the establishment of the synchronization, and a fourth state in which the communication is stopped for a longer time than the third state and synchronization is reestablished with the first communication device when restarting the communication,
a first communication control unit that repeats, in a first cycle, an operation of continuously transmitting a first signal within a first signal interval to the first communication device in the fourth state, and
a second communication control unit that transmits, upon receiving a second signal output from the first communication device in response to the first signal, a third signal synchronized with the second signal, and transitions from the fourth state to the first state.
(19) The communications system according to (18), further including
a third communication device that alternately transmits/receives information to/from the first communication device within the period assigned by the TDD communication method and alternately transmits/receives information to/from the second communication device within the period assigned by the TDD communication method, in which
the third communication device includes
a first communication control unit that transmits, upon repeatedly receiving, in a first cycle, a first signal continuously transmitted from the second communication device within a first signal interval while the second communication device is in the fourth state, the received first signal to the first communication device,
a second communication unit that transmits, upon receiving a second signal output from the first communication device in response to the first signal, the second signal to the second communication device, and
a second communication control unit that transmits, upon receiving a third signal synchronized with the second signal from the second communication device, the third signal to the first communication device and transitions from the fourth state to the first state.
(20) The communications system according to (19), further including
a plurality of the third communication devices connected to each other by daisy chain between the first communication device and the second communication device, in which
each of the plurality of third communication devices sequentially transmits, to the third communication device on a side closer to the first communication device or to the first communication device, the first signal of the first cycle continuously transmitted from the second communication device within the first signal interval while the plurality of third communication devices and the second communication device are in the fourth state, sequentially receives a second signal synchronized with the first signal transmitted from the first communication device, transmits the received second signal to the third communication device on a side closer to the second communication device or to the second communication device, and transitions from the fourth state to the first state.

Embodiments of the present disclosure are not limited to the above-mentioned individual embodiment and includes various modifications that can be conceived by those skilled in the art, and the effects of the present disclosure are also not limited the above-mentioned content. In other words, various additions, changes, and partial deletions are possible without departing from the conceptual idea and essence of the present disclosure derived from the content specified in the claims and equivalents thereof.

It should be understood by those skilled in the art that various modifications, combinations, sub-combinations and alterations may occur depending on design requirements and other factors insofar as they are within the scope of the appended claims or the equivalents thereof.

What is claimed is:
1. A communication device, comprising:
a state-switching control circuit that controls switching between a first state in which synchronization for communicating with a communication partner device is established, a second state in which the communication is started after establishing the synchronization in the first state, a third state in which the communication is intermittently stopped without losing the establishment of the synchronization, and a fourth state in which the communication is stopped for a longer time than the third state and synchronization is reestablished with the communication partner device when restarting the communication;

a first communication control circuit that repeats, in a first cycle, an operation of continuously transmitting a first signal within a first signal interval to the communication partner device in the fourth state; and a second communication control circuit that transmits, upon receiving a second signal output from the communication partner device in response to the first signal, a third signal synchronized with the second signal to the communication partner device, wherein the state-switching control circuit switches, where the second communication control circuit transmits the third signal, a state from the fourth state to the first state.

2. The communication device according to claim 1, wherein
the first communication control circuit repeats, in the first cycle, an operation of continuously transmitting the first signal within the first signal interval, the first signal being generated using a pseudo-random number.

3. The communication device according to claim 2, wherein the first communication control circuit generates the first signal on a basis of a polynomial of $X^{23}+X^5+1$.

4. The communication device according to claim 1, wherein the first signal has a signal amplitude that is equal to or less than a signal amplitude of the second signal.

5. The communication device according to claim 4, wherein the signal amplitude of the first signal is 0.2 times or more and 0.8 times or less the signal amplitude of the second signal.

6. The communication device according to claim 5, wherein the signal amplitude of the first signal is 0.4 times or more and 0.6 times or less the signal amplitude of the second signal.

7. The communication device according to claim 6, wherein the signal amplitude of the first signal is 0.5 times the signal amplitude of the second signal.

8. The communication device according to claim 1, wherein the first signal interval is equal to or less than a second signal interval in which the second signal is continuously output.

9. The communication device according to claim 8, wherein the first signal interval is 0.5 times the second signal interval.

10. The communication device according to claim 1, wherein the first signal interval is 768 [nsec], and the first cycle is 4816 [nsec].

11. The communication device according to claim 1, wherein the first signal interval is 1536 [nsec], and the first cycle is 3280 [nsec].

12. The communication device according to claim 1, wherein
the first signal and the second signal have the same signal amplitude and the same cycle, and
the first signal interval has the same length as that of a second signal interval in which the second signal is continuously output.

13. The communication device according to claim 12, wherein each of the first signal interval and the second signal interval is 1536 [nsec], and each of the first signal and the second signal has a cycle of 3280 [nsec].

14. The communication device according to claim 1, wherein information is alternately transmitted/received to/from the communication partner device within a period assigned by a time division duplex (TDD) communication method.

15. A communication device, comprising:
a first state-switching control circuit that controls switching between a first state in which synchronization for communicating with a first communication partner device is established, a second state in which the communication is started after establishing the synchronization in the first state, a third state in which the communication is intermittently stopped without losing the establishment of the synchronization, and a fourth state in which the communication is stopped for a longer time than the third state and synchronization is reestablished with the first communication partner device when restarting the communication;

a second state-switching control circuit that controls switching between the first state, the second state, the third state, and the fourth state in communication with a second communication partner device;

a first communication control circuit that transmits, upon repeatedly receiving, in a first cycle, a first signal continuously transmitted from the second communication partner device within a first signal interval while the second communication partner device is in the fourth state, the received first signal to the first communication partner device; and a second communication control circuit that transmits, upon receiving a second signal output from the first communication partner device in response to the first signal, the second signal to the second communication partner device, wherein the first state-switching control circuit transitions from the fourth state to the first state upon transmitting the second signal from the first communication partner device.

16. The communication device according to claim 15, wherein
the second state-switching control circuit causes, where the first signal from the second communication partner device has been received in the fourth state, the first communication partner device in the first state, the second state, or the third state to transition to the first state.

17. A communications system, comprising:
a first communication device; and
a second communication device that alternately transmits/receives information to/from the first communication device within a period assigned by a time division duplex (TDD) communication method, wherein
the second communication device includes
a state-switching control circuit that controls switching between a first state in which synchronization for communicating with the first communication device is established, a second state in which the communication is performed after establishing the synchronization in the first state, a third state in which the communication is intermittently stopped without losing the establishment of the synchronization, and a fourth state in which the communication is stopped for a longer time than the third state and synchronization is reestablished with the first communication device when restarting the communication,
a first communication control circuit that repeats, in a first cycle, an operation of continuously transmitting a first signal within a first signal interval to the first communication device in the fourth state, and a second communication control circuit that transmits, upon receiving a second signal output from the first communication device in response to the first signal, a third signal synchronized with the second signal, and transitions from the fourth state to the first state.

18. The communications system according to claim 17, further comprising a third communication device that alternately transmits/receives information to/from the first communication device within the period assigned by the TDD communication method and alternately transmits/receives information to/from the second communication device within the period assigned by the TDD communication method, wherein the third communication device includes
- a third communication control circuit that transmits, upon repeatedly receiving, in the first cycle, the first signal continuously transmitted from the second communication device within the first signal interval while the second communication device is in the fourth state, the received first signal to the first communication device,
- a fourth communication control circuit that transmits, upon receiving a second signal output from the first communication device in response to the first signal, the second signal to the second communication device, and
- a fifth communication control circuit that transmits, upon receiving a third signal synchronized with the second signal from the second communication device, the third signal to the first communication device and transitions from the fourth state to the first state.

19. The communications system according to claim 18, wherein the third communication device is one of a plurality of the third communication devices connected to each other by daisy chain between the first communication device and the second communication device, wherein each of the plurality of third communication devices sequentially transmits, to the third communication device on a side closer to the first communication device or to the first communication device, the first signal of the first cycle continuously transmitted from the second communication device within the first signal interval while the plurality of third communication devices and the second communication device are in the fourth state, sequentially receives a second signal synchronized with the first signal transmitted from the first communication device, transmits the received second signal to the third communication device on a side closer to the second communication device or to the second communication device, and transitions from the fourth state to the first state.

* * * * *